(12) United States Patent
Cahill et al.

(10) Patent No.: US 9,121,753 B2
(45) Date of Patent: Sep. 1, 2015

(54) CONTROL TECHNIQUES FOR MOTOR DRIVEN SYSTEMS UTILIZING BACK-EMF MEASUREMENT TECHNIQUES

(71) Applicants: Alan Patrick Cahill, Galway City (IE); Gary Casey, Prospect (IE); John A. Cleary, Kilmallock (IE); Eoin Edward English, Pallasgreen (IE); Christian Jimenez, Valencia (ES); Javier Calpe Maravilla, Algemesi (ES); Colin G. Lyden, Baltimore (IE); Thomas F. Roche, Limerick (IE)

(72) Inventors: Alan Patrick Cahill, Galway City (IE); Gary Casey, Prospect (IE); John A. Cleary, Kilmallock (IE); Eoin Edward English, Pallasgreen (IE); Christian Jimenez, Valencia (ES); Javier Calpe Maravilla, Algemesi (ES); Colin G. Lyden, Baltimore (IE); Thomas F. Roche, Limerick (IE)

(73) Assignee: ANALOG DEVICES GLOBAL, Hamilton (BM)

( * ) Notice: Subject to any disclaimer, the term of this patent is extended or adjusted under 35 U.S.C. 154(b) by 0 days.

(21) Appl. No.: 13/760,622

(22) Filed: Feb. 6, 2013

(65) Prior Publication Data

US 2014/0217945 A1    Aug. 7, 2014

(51) Int. Cl.
  *H02K 41/00*    (2006.01)
  *G01H 13/00*    (2006.01)
  *H02P 25/02*    (2006.01)

(52) U.S. Cl.
  CPC .............. *G01H 13/00* (2013.01); *H02P 25/028* (2013.01)

(58) Field of Classification Search
  USPC ................. 318/135, 119, 122, 126, 127, 128, 318/400.34, 400.35; 310/12, 15, 17, 21
  See application file for complete search history.

(56) References Cited

U.S. PATENT DOCUMENTS

| 4,280,162 | A | | 7/1981 | Tanka et al. |
| 4,477,755 | A | | 10/1984 | Rickert |
| 4,761,774 | A | | 8/1988 | Ishibashi et al. |
| 5,017,845 | A | * | 5/1991 | Carobolante et al. .... 318/400.11 |
| 5,091,697 | A | | 2/1992 | Roth et al. |
| 5,200,940 | A | | 4/1993 | Goto et al. |

(Continued)

FOREIGN PATENT DOCUMENTS

| EP | 1063760 A2 | 12/2000 |
| EP | 2216897 A2 | 8/2010 |

(Continued)

OTHER PUBLICATIONS

Enz et al., 1996, "Circuit Techniques for Reducing the Effects of Op-Amp Imperfections: Autozeroing, Correlated Double Sampling, and Chopper Stabiliziation", Proceedings of the IEEE, 84(11):1584-1614.

(Continued)

*Primary Examiner* — Eduardo Colon Santana
*Assistant Examiner* — Bickey Dhakal
(74) *Attorney, Agent, or Firm* — Kenyon & Kenyon LLP (57) ABSTRACT

A method and apparatus for automatic resonance detection is disclosed for a motor-driven mechanical system such as a voice coil motor (VCM) in which a resonance detector and driver are provided. The automatic resonance detector is implemented on the same integrated circuit as the driver, and dynamically determines the natural resonant frequency of the VCM driven by the driver. The resonant frequency is determined by measuring the back electromotive force (BEMF) of the VCM, detecting the slope of the BEMF signal, and determining the resonant frequency from the slope of the BEMF signal.

22 Claims, 7 Drawing Sheets

(56) References Cited

U.S. PATENT DOCUMENTS

| | | | |
|---|---|---|---|
| 5,444,479 A | | 8/1995 | Fernekes et al. |
| 5,600,219 A | | 2/1997 | Gomez |
| 5,844,743 A | | 12/1998 | Funches |
| 6,437,524 B1 | * | 8/2002 | Dimanstein ............... 318/135 |
| 6,515,379 B1 | | 2/2003 | Nojima et al. |
| 6,809,434 B1 | * | 10/2004 | Duncan et al. ............ 310/12.19 |
| 6,888,694 B2 | | 5/2005 | Guo et al. |
| 6,937,427 B2 | | 8/2005 | Tan et al. |
| 7,031,094 B2 | | 4/2006 | Chung |
| 7,068,923 B2 | | 6/2006 | Miyazaki |
| 7,084,958 B2 | | 8/2006 | Butler |
| 7,193,804 B1 | | 3/2007 | Kheymehdooz |
| 7,315,493 B2 | | 1/2008 | Van Brocklin et al. |
| 7,456,595 B2 | | 11/2008 | Ratliff et al. |
| 7,501,616 B2 | | 3/2009 | Wiklof |
| 7,663,275 B2 | * | 2/2010 | McGill et al. ............... 310/68 R |
| 7,769,110 B2 | | 8/2010 | Momtaz |
| 8,228,017 B2 | | 7/2012 | Lyden et al. |
| 8,299,744 B2 | | 10/2012 | Lyden et al. |
| 2002/0079854 A1 | | 6/2002 | Kitamura et al. |
| 2002/0136127 A1 | * | 9/2002 | Watt ............................ 369/53.3 |
| 2003/0133218 A1 | | 7/2003 | Guo et al. |
| 2004/0090878 A1 | | 5/2004 | Soma et al. |
| 2005/0082996 A1 | | 4/2005 | Luebbe |
| 2005/0134562 A1 | | 6/2005 | Grant et al. |
| 2005/0151720 A1 | | 7/2005 | Cruz-Hernandez et al. |
| 2005/0162105 A1 | | 7/2005 | Yamasaki et al. |
| 2005/0166015 A1 | | 7/2005 | Bruner et al. |
| 2005/0169119 A1 | | 8/2005 | Van Brocklin et al. |
| 2006/0074405 A1 | | 4/2006 | Malackowski et al. |
| 2006/0290662 A1 | | 12/2006 | Houston et al. |
| 2007/0216343 A1 | | 9/2007 | Rozman et al. |
| 2007/0241711 A1 | | 10/2007 | Finamore et al. |
| 2008/0062143 A1 | | 3/2008 | Shahoian |
| 2008/0086670 A1 | | 4/2008 | Krouk et al. |
| 2008/0158406 A1 | | 7/2008 | Ito |
| 2008/0170322 A1 | | 7/2008 | Konishi |
| 2008/0191648 A1 | * | 8/2008 | Ito et al. ..................... 318/128 |
| 2008/0246532 A1 | | 10/2008 | Cosper et al. |
| 2009/0222711 A1 | | 9/2009 | Belogolovy |
| 2009/0278819 A1 | | 11/2009 | Goldenberg et al. |
| 2010/0052585 A1 | | 3/2010 | Bonvin et al. |
| 2010/0201300 A1 | | 8/2010 | Lyden et al. |
| 2012/0200763 A1 | | 8/2012 | Ninomiya |
| 2012/0229264 A1 | * | 9/2012 | Company Bosch et al. ....................... 340/407.1 |

FOREIGN PATENT DOCUMENTS

| | | |
|---|---|---|
| EP | 2434487 A1 | 3/2012 |
| JP | 2001016892 A | 1/2001 |
| JP | 2002277809 A | 9/2002 |
| JP | 2006162024 A | 6/2006 |
| JP | 2008546534 A | 12/2008 |
| JP | 2009278781 A | 11/2009 |
| WO | 2007002775 A2 | 1/2007 |

OTHER PUBLICATIONS

Shin et al., 2004, "LFSR-Based BIST for Analog Circuits Using Slope Detection", pp. 316-321.
Zhang et al., 2011, "Design and analysis of a switched-capacitator-based peak detector", pp. 1001-1004.
Kruiskamp et al., 1994, "A CMOS Peak Detect Sample and Hold Circuit", IEEE Transactions on Nuclear Science, 41 (1):295-298.
Allstot, 1982, "A Precision Variable-Supply CMOS Comparator", IEEE Journal of Solid-State Circuits, SC-17 (6):1080-1087.
International Search Report and Written Opinion issued Jul. 5, 2012, in international application No. PCT/US2012/028411.
European Supplementary Search Report issued in counterpart European application No. 12754947, communication dated Oct. 28, 2014, 8 pages.
PCT International Search Report and Written Opinion for PCT/IB2014/000104, mailed on Jun. 3, 2015, 10 pages.

* cited by examiner

FIG. 4A
BEMF SIGNAL

FIG. 4B
POLARITY OF BEMF SIGNAL

FIG. 4C
POLARITY OF BEMF SLOPE

CONTROL TECHNIQUES FOR MOTOR DRIVEN SYSTEMS UTILIZING BACK-EMF MEASUREMENT TECHNIQUES

BACKGROUND

The present invention relates to motor control and control of motor driven systems. More specifically, it relates to a method and apparatus for determining the resonant frequency of a motor system, such as a voice coil motor (VCM), for use in anti-ringing control systems.

Motor-driven translational systems are commonplace in modern electrical devices. They are used to move a mechanical system within a predetermined range of motion under electrical control. Common examples include image stabilization and autofocus systems for digital cameras, video recorders, portable devices having such functionality (e.g., mobile phones, personal digital assistants, and hand-held gaming systems), and laser drivers for optical disc readers.

In a camera or video recorder, a lens driver controls an actuator that moves the lens assembly back and forth for image stabilization and to adjust focus and magnification. One such actuator is the VCM. In a VCM, the lens position is fixed by balancing the motor and spring forces of the VCM. In other words, the VCM can be modeled as a mass coupled to a spring. When a motor moves the mass according to the drive signal, the motion generates other forces within the system which can cause the mass to oscillate around the new location at some resonant frequency ($f_R$). This oscillation is also known as "mechanical ringing." For example, resonant frequencies of approximately 110 Hz have been observed in consumer electronic products. Such oscillation typically diminishes over time, but impairs performance of the device in its intended function by, for example, extending the amount of time that a camera lens system takes to focus an image, distorting the image, and shortening the lifetime of the VCM.

Mechanical ringing of VCMs can be reduced by minimizing the energy supplied to the VCM at its resonant frequency, which will in turn enable the user to achieve fast mechanical settling times and enhance autofocus response times and image quality. The response of the VCM may be damped by filtering the drive signal applied to the VCM, for example through a notch filter with a center frequency at the resonant frequency, and having a stopband sufficiently wide to accommodate the expected tolerance around a VCM nominal resonant frequency. Currently, the VCM nominal resonant frequency is a single fixed frequency estimated and pre-programmed into a motor driver before operation.

Pre-programming the resonant frequency, however, can cause imprecise operation. The resonant frequency of a VCM may vary due to different vendors, the manufacturing process, or age. System manufacturers often do not know the resonant frequency of their mechanical systems precisely. Additionally, particularly in consumer electronics where system components must be made inexpensively, the resonant frequency can vary across different manufacturing lots of a common product. Furthermore, as a VCM ages, its resonant frequency may change as well. Thus, the end-user estimated and programmed nominal resonant frequency may be substantially different from the actual resonant frequency of the mechanical system.

Thus, there is a need in the art for a method to dynamically and accurately determine the natural resonant frequency of a VCM actuator, to aid the design of shorter filters, and accommodate the variations in resonant frequency. It would be further advantageous for this method to be automatic resonance detection built into the motor driver on-chip. It would be further advantageous for the resonant frequency detection to be designed to enable anti-ringing filtering "on-the-fly."

DETAILED DESCRIPTION

Embodiments of the present invention provide techniques for determining the resonant frequency of a motor-driven mechanical system. Such techniques may include driving a current step into the motor-driven mechanical system and detecting a BEMF (back electromotive force) signal therefrom. Thereafter, a slope of the BEMF signal may be derived and its polarity may be measured. The resonant frequency of the mechanical system may be derived by measuring a time that elapses between a first type of polarity change and a subsequent occurrence of the same type of polarity change. For example, the time between successive positive-to-negative transitions in the signal (or slope signal) or the time between successive negative-to-positive transitions in the signal (or slope signal) may reflect the resonant frequency of the mechanical system. Such techniques may be employed in a motor driver that measures the resonant frequency prior to run-time operation (for example, during start up), then applies the resonant frequency during run-time operation.

Figure 1:
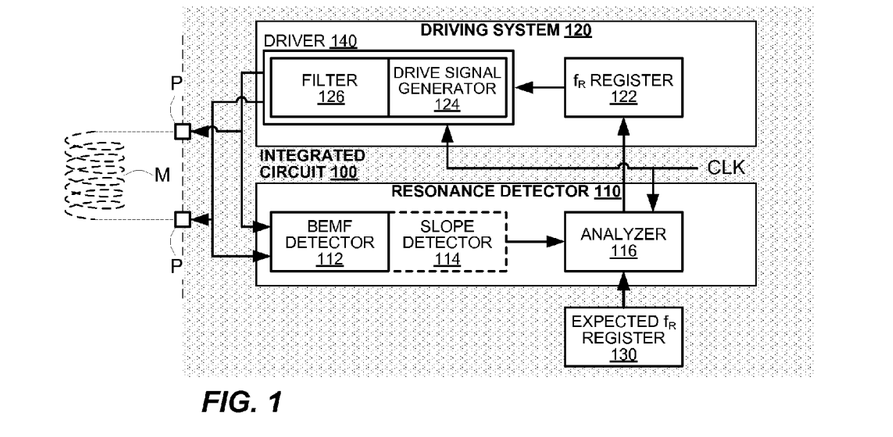
FIG. 1 is a block diagram of a system according to an embodiment of the present invention.

FIG. 1 illustrates a motor driver system 100 according to an embodiment of the present invention. The system 100 may include a resonance detector 110 and a driving system 120, which may be provided in a common integrated circuit. The system 100 may be coupled at pins P to an external mechanical system M (which may include a VCM or other motor) that is to be driven by the system 100. The driving system 120 may generate driving signals to the motor M during different modes of operation—a resonance detection mode and a run-time mode. The resonance detector 110 may detect a resonant frequency $f_R$ of the motor M based on measurements taken at one or more pins P. The resonance detector 110 may provide its estimated resonance frequency $f_R$ to the driving system 120 for use in run-time operation of the system 100.

In an embodiment, the resonance detector 110 may include a BEMF detector 112, slope detector 114, and analyzer 116.

The BEMF detector 112 may detect a BEMF signal generated by the motor M. The slope detector 114 may detect and measure a slope of the BEMF signal. The analyzer 116 may determine the resonant frequency of the VCM based on the slope information received. The BEMF detector 112 and slope detector 114 may be implemented as a single circuit or as separate circuits.

During operation, the mechanical system M may generate a BEMF signal, which may be induced by vibration of the mechanical system M. The BEMF's signal frequency may correspond to the mechanical system's resonant frequency. This signal may be measured by the BEMF detector 112 through pins P. The BEMF detector 112 may capture the BEMF signal and output a representation of the BEMF signal to the analyzer 116. For example, the BEMF detector 112 may output a captured BEMF signal to a slope detector 114, which may detect the polarity of the slope therefrom and may output signals representing changes in slope polarity of the BEMF signal to the analyzer 116. The analyzer 116 may estimate the resonant frequency of the mechanical system M by measuring the time between successive positive-to-negative transitions in the slope signal or the time between successive negative-to-positive transitions in the slope signal. The analyzer 116 may perform its operations according to a system clock signal CLK, and may output the resonant frequency to driving system 120.

FIG. 1 also illustrates components of an exemplary driving system 120, which may include an $f_R$ register 122 and a driver 140, which may include a drive signal generator 124 and a filter 126. The $f_R$ register 122 may store data representing the resonant frequency of the mechanical system M. The driver 140 may read the resonant frequency data from resonant frequency register 122 and may generate a drive signal tuned to the resonant frequency to drive VCM M. FIG. 1 illustrates a filter 126 representing filtering to conform the drive signal to the detected resonant frequency of the mechanical system M. Filter 126 and drive signal generator 124 may be implemented as a single circuit or as separate circuits.

The driver 140 may perform its operations according to a system clock signal CLK. The driver 140 may output a drive signal according to the resonant frequency determined by the analyzer 116 and stored in the $f_R$ register 122. The frequency distribution of the drive signal may be controlled to have zero (or near zero) energy at the detected resonant frequency $f_R$ of the mechanical system M. The drive signal may include pulses according to timing determined from $$t_c \cong \frac{1}{2f_R}.$$

The drive signal also may be filtered by a filter 126 to broaden a zero-energy notch at the detected resonant frequency, $f_R$.

Although FIG. 1 illustrates the mechanical system M being coupled to the motor driver system 100 by a pair of pins P, the principles of the present invention accommodate other embodiments. For example, the mechanical system M may be coupled to the motor driver system 100 at a single pin P (a second terminal of the mechanical system M may be coupled to ground). In another configuration, shown herein in other drawings, the motor driver system 100 and mechanical system M may be connected in series between a pair of supply voltages. Thus different embodiments of the present invention permit the resonance detector 110 to capture a representation of the BEMF signal by sampling voltages across the motor or across the motor driver system 100 and derive the resonance frequency from each of these sampling methodologies.

In a further embodiment, the motor driver system 100 may include a register 130 to store expected resonant frequency such as one that is preprogrammed by a manufacturer or user of the system 100. During a resonance detection mode, the motor driver system 100 may develop a drive signal to the mechanical system M that matches the expected resonant frequency as stored in the register 130. The actual resonant frequency may then be confirmed or determined therefrom.

Figure 2:
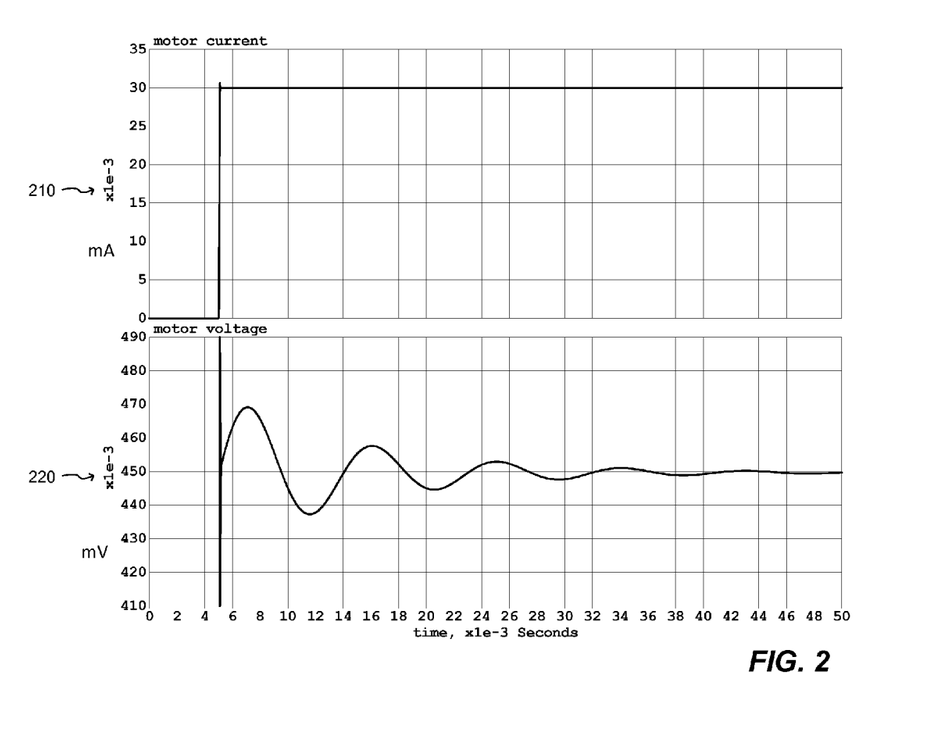
FIG. 2 is an exemplary waveform diagram of a current step driven into a VCM, and the corresponding voltage across the VCM.

FIG. 2 illustrates waveforms that may occur in a system such as FIG. 1. A driving system may apply a driving current 210 to a mechanical system. In the example of FIG. 2, drive current 210 is illustrated as provided as a current step that increases to a predetermined value (0 mA to 30 mA in the example of FIG. 2) as quickly as circuit components allow. FIG. 2 simulates a voltage 220 that may be developed across the mechanical system M in response to a drive current 210. The motor voltage 220 has a DC component representing the driving signal and a BEMF voltage, created by vibration of the mechanical system M, which is superimposed over the driving signal. The BEMF voltage may decay over time as shown in motor voltage graph 220.

Figure 3:
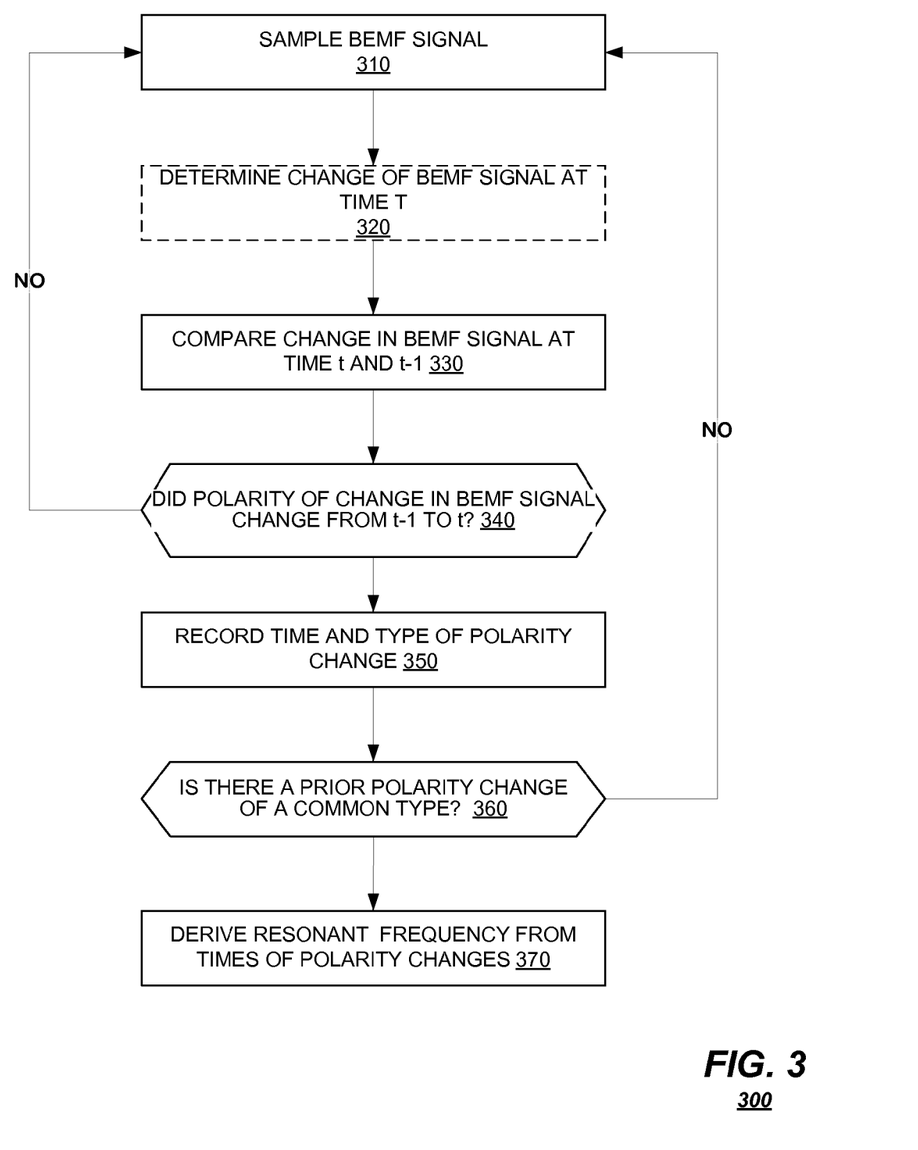
FIG. 3 is a flowchart illustrating a method for determining a resonant frequency of a VCM by sampling a BEMF signal according to an embodiment of the present invention.

FIG. 3 illustrates a method 300, according to an embodiment of the present invention, for sampling a BEMF signal and deriving a resonant frequency of the mechanical system M therefrom. The method 300 may be performed iteratively over several sampling instants, represented at times T, T-1, T-2, etc. The method may sample a BEMF signal generated from the mechanical system M at a current iteration, represented as time T (box 310). In step 320, the method may estimate a change in the BEMF signal ($\Delta BEMF_T$) from a preceding sample, taken at time T-1, to the current sample, taken at time T. In steps 330 and 340, the method may compare the $\Delta BEMF$ signals at times T-1 and T ($\Delta BEMF_T$, $\Delta BEMF_{T-1}$) to each other to determine whether they have common polarities (e.g., both positive or both negative). If the polarities are the same, then method 300 may return to step 310 for another iteration of sampling.

If, in step 340, the method 300 determined that the $\Delta BEMF$ polarities are not the same, then method 300 may proceed to step 350. In step 350, the method 300 may record a time of sample T and, optionally, a type of polarity change. The type may be a positive-to-negative or negative-to-positive change. In step 360, the method 300 may determine whether a previous change in polarity has been recorded having the same type as the present change. If there was not a previous change in polarity of the same type, method 300 may return to step 310 for another iteration of sampling. If there was a previous change in polarity of the same type, the method 300 may derive the resonant frequency of the mechanical system M from the times of the two polarity changes in polarity of the same type.

Although FIG. 3 illustrates a method that operates directly on BEMF signals to generate $\Delta BEMF$ signals and polarities thereof, other embodiments of the present invention may be applied to filtered BEMF signals. For example, in another embodiment (not shown), the method 300 may develop a slope of the BEMF signal by filtering the BEMF signal or other processing, then sample a signal representing the slope of the BEMF signal rather than sampling the BEMF signal directly. In this embodiment, operations of boxes 310-360 may be performed on the sampled slope signal rather than the BEMF signal itself. In all other respects, the operations of FIG. 3 may be performed directly on the sampled slope signal.

Figure 4A:
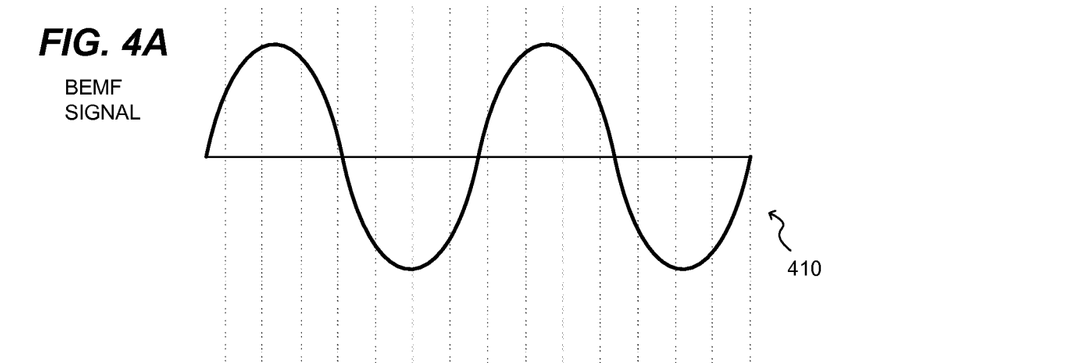
FIGS. 4A-4C illustrate exemplary signals that may be processed as part of resonant frequency estimation.
Figure 4B:
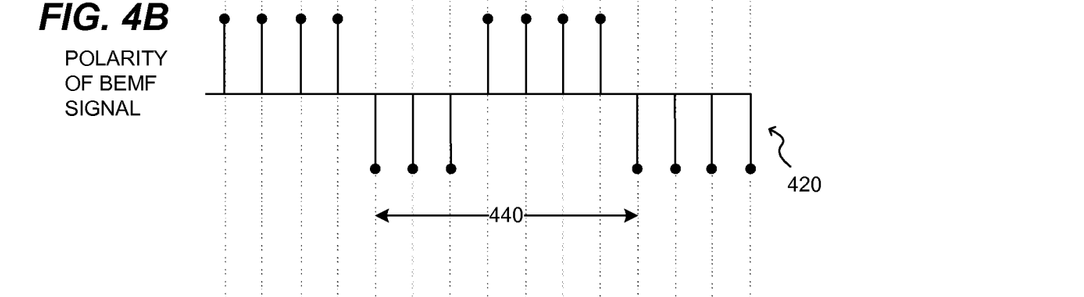
Figure 4C:
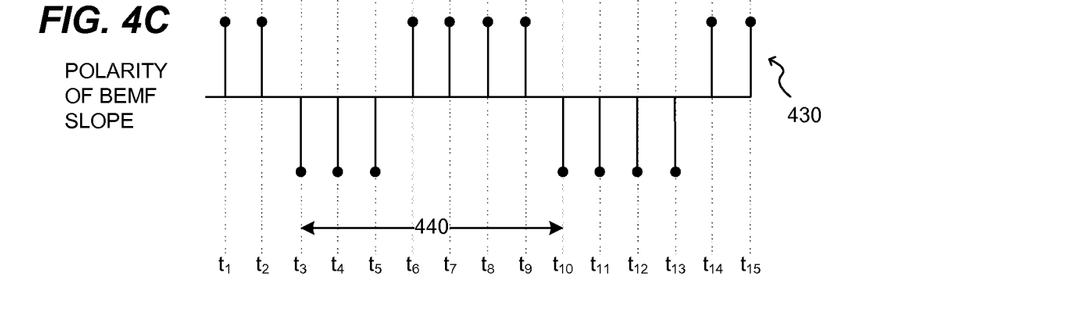

FIGS. 4A to 4C illustrate exemplary signals that may be generated by various embodiments of the present invention during detection of a resonant frequency of the mechanical system M. FIG. 4A shows an exemplary BEMF signal 410, which may be sampled by a BEMF detector and processed as described in FIG. 3 and elsewhere herein. FIGS. 4B and 4C each illustrate different processing techniques that may be applied to such a signal. FIGS. 4A-4C illustrate exemplary sampling operations that are performed at times $t_1$-$t_{15}$ respectively.

FIG. 4B shows application of the method of FIG. 3 to the BEMF signal directly. In this embodiment, pulses 420 at times $t_1$-$t_{15}$ represent a comparison between the BEMF signal 410 and a reference voltage (such as ground). A resonant period of the BEMF signal may be detected as an amount of time that elapses between two adjacent transitions in the BEMF signal of a common type (e.g. two high-to-low transitions or two adjacent low-to-high transitions). For example, transitions at times $t_5$ and $t_{12}$ are of a common type.

FIG. 4C shows application of the method of FIG. 3 to a slope of the BEMF signal. In this embodiment, pulses 430 at times $t_1$-$t_{15}$ represent a direction of the slope of the BEMF signal 410 (e.g., the BEMF signal 410 is rising or falling). A resonant period of the BEMF signal 410 may be detected as an amount of time that elapses between two adjacent transitions in the BEMF slope signal 430 of a common type (e.g. two high-to-low transitions or two adjacent low-to-high transitions). For example, transitions at times $t_3$ and $t_{10}$ are of a common type. The example provided above shows a single iteration of the method steps which results in detection of a single period. However, it is also possible to consider other samples forming additional sets of rising or falling edges. For example, the resonant frequency may be derived from the average of a plurality of time durations. This may improve the accuracy of the resonant frequency measurement or serve as an error-check.

Moreover, the example of FIGS. 4A-4C illustrate exemplary sampling intervals so as to illustrate operational principles of the present invention. In practice, sampling intervals may occur at a rate much higher than an expected resonant period of the BEMF signal (e.g., for a BEMF signal with an expected resonant frequency 150 Hz, a sampling rate in excess of 15 KHz may be used.). In implementation, the sampling rate may be tailored to suit individual application needs.

Figure 5A:
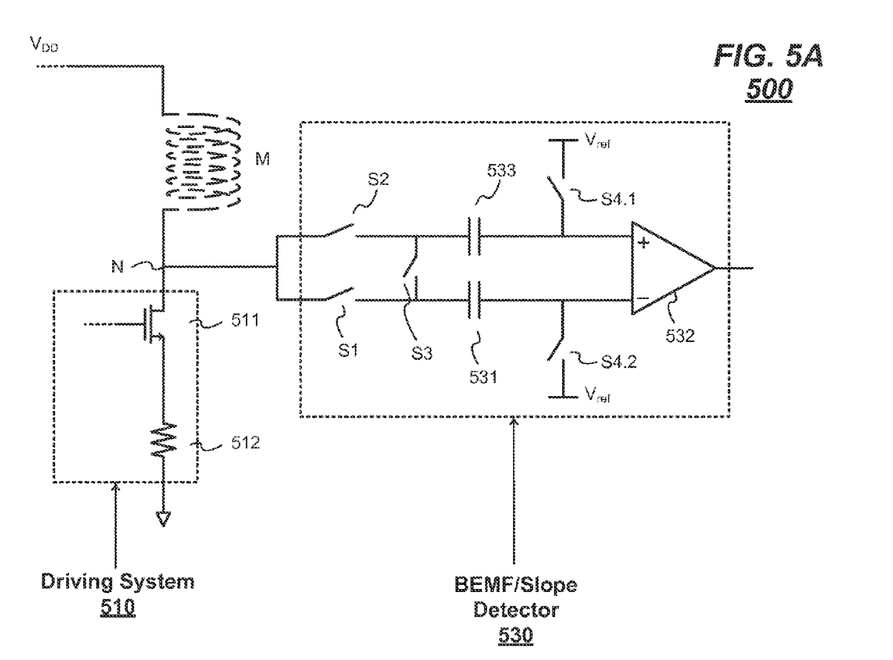
FIG. 5A is a simplified circuit diagram of a single-ended switched-capacitor slope detector according to an embodiment of the present invention.

FIG. 5A is a circuit diagram of a motor driver system 500 according to an embodiment of the present invention. The system 500 may include a driving system 510 and a BEMF/Slope detector 530, each coupled to a mechanical system M. In the embodiment illustrated in FIG. 5A, the mechanical system M may be coupled in series with components 511, 512 of the driving system 510 between a supply voltage VDD and ground. The BEMF/Slope detector 530 may be coupled to a node N between the mechanical system M and the driving system 510 and may capture the BEMF signal at the node N.

The slope detector 530 may include switches S1, S2, S3, and S4.1 and S4.2, capacitors 531 and 533, and a comparator 532. A first switch S1 may connect a first terminal (an "input terminal," for convenience) of capacitor 531 to the input node N and a second switch S2 may connect an input terminal of capacitor 533 to the input node N. A third switch S3 may connect the input terminals of the two capacitors 531, 533 to each other. Second terminals (called "output terminals," for convenience) of each capacitor 531, 533 may be connected to respective positive and negative inputs of the comparator 532. Switches S4.1 and S4.2 may connect the output terminals of the respective capacitors 531, 533 to a reference voltage Vref. The comparator 532 may produce a binary output, which is output from the BEMF/Slope detector 530.

The BEMF/Slope detector 530 may generate a binary signal representing a type of change in the BEMF signal obtained from the mechanical system (e.g., the BEMF signal is rising or it is falling). The BEMF/Slope Detector 530 may operate iteratively at a predetermined clock rate.

FIG. 5A provides only a partial representation of the driving system 510. The driving system 510 may include a transistor 511 and a resistor 512 coupled in the VDD to ground path that is occupied by the mechanical system M. The transistor 511 may receive a control signal from other components of the driving system 510 (e.g., a drive signal generator 124 in FIG. 1) that modulates an amount of driving current that may pass through the motor M. In this configuration, vibrations that may be induced in the motor M due to mechanical resonance may induce corresponding fluctuations in voltage at the input node N to the BEMF/source detector 530 and may be detected by the circuit 530.

Figure 5B:
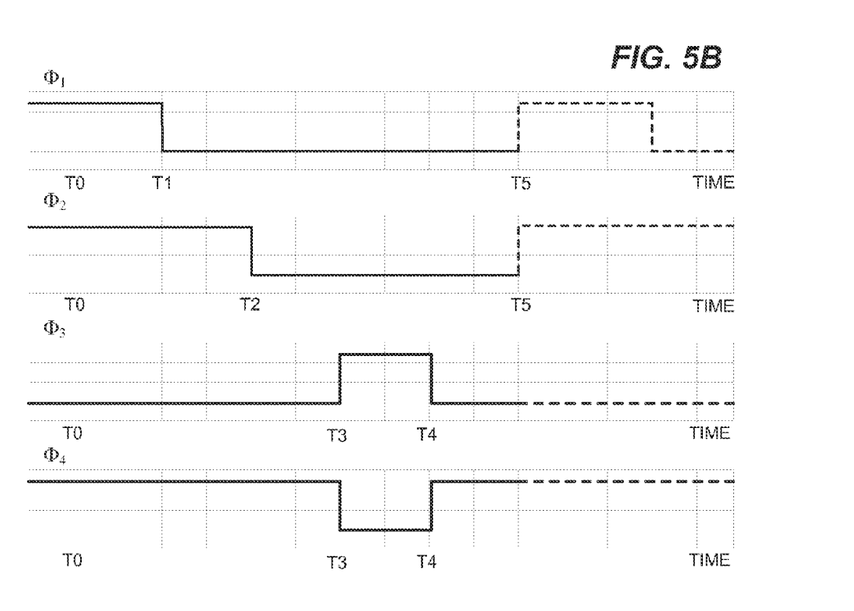
FIG. 5B is an exemplary timing diagram of sampled signals corresponding to the operation of the circuit of FIG. 5A.

FIG. 5B is an exemplary timing diagram of control signals that may be applied to the switches S1, S2, S3, and S4.1 and S4.2 of FIG. 5A. At time T0, switches S1, S2, and S4.1 and S4.2 are closed and switch S3 is open. While switches S4.1 and S4.2 are closed, both inputs to the comparator 532 are pulled to Vref. At time T1, switch S1 may open and a voltage is captured on the capacitor 531 representing a difference between the BEMF signal (BEMFT1) and Vref. At time T2, switch S2 may open and a second voltage is captured on capacitor 533 representing a difference between the BEMF signal (BEMFT2) and Vref. At time T3, switches S4.1 and S4.2 may open and switch S3 may close, forcing charge redistribution at the input terminals of capacitors 531 and 533. This results in voltages on the output terminals of the capacitors 531 and 533 to move corresponding to a difference between BEMFT1 and BEMFT2. The comparator 532 may generate a binary signal corresponding to a direction of change between the BEMF signal at times T1 and T2.

The switches may reset the BEMF/Slope detector 530 at times T4 and T5 to prepare it for another iteration of operation. At time T4, switches S4.1 and S4.2 may close and switch S3 may open, which pulls the output terminals of the capacitors 531, 533 to Vref. Switches S1, S2 may close at time T5, which couples the input terminals of the capacitors 531, 533 to the input node N.

Figure 6:
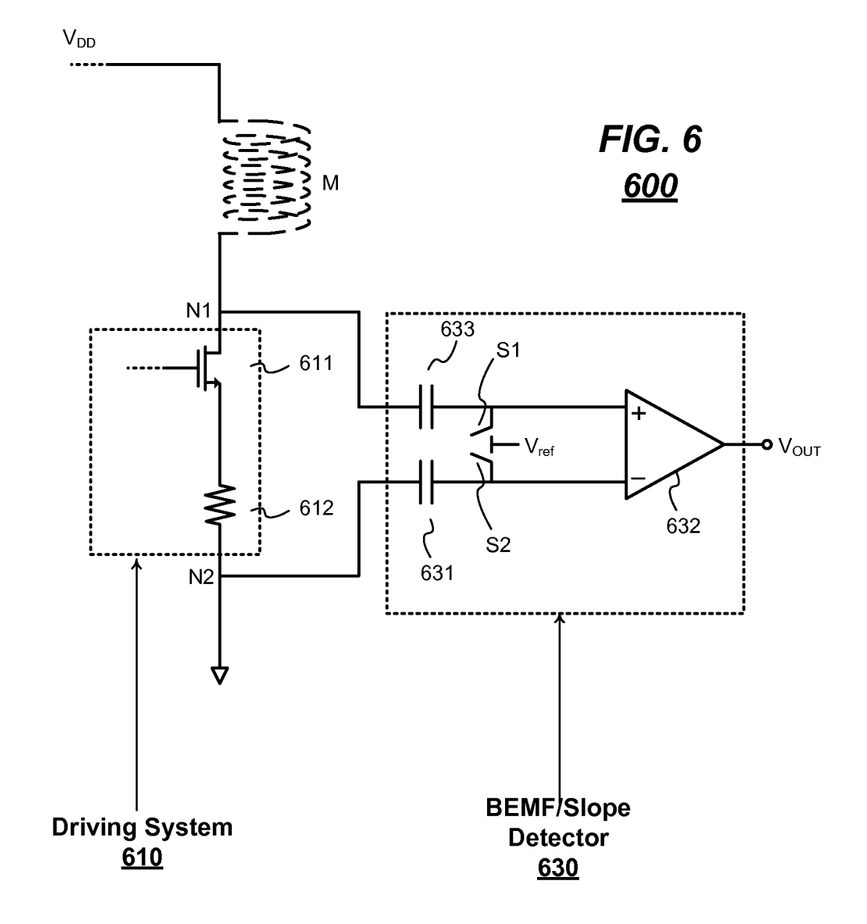
FIG. 6 is a simplified circuit diagram of a differential switched-capacitor slope detector according to an embodiment of the present invention.

FIG. 6 shows a simplified circuit diagram of a motor driver system 600 with a BEMF/slope detector 630 according to another embodiment of the present invention. In this embodiment, the BEMF/slope detector 630 has a pair of inputs coupled across the driving system 610, shown here as nodes N1, N2. The BEMF/slope detector 630 may include capacitors 631 and 633, switches S1 and S2, and a comparator 632. A first terminal (again, the "input terminal") of capacitor 633 may be connected to a node N1 that connects the motor M to the driving system 610. An input terminal of capacitor 631 may be connected to a second node N2, which in the configuration illustrated in FIG. 6 is shown as ground. Output terminals of the capacitors 631, 633 may be coupled to respective positive and negative inputs of the comparator 632. Switches S1 and S2 respectively may connect the output terminals of the capacitors 631, 633 to a reference voltage $V_{ref}$. The comparator 632 may produce a binary output.

The BEMF/slope detector 630 of the FIG. 6 embodiment is a differential system. It develops a binary output signal from a comparison of voltages present at nodes N1 and N2. By operating differentially, this embodiment may improve power supply and common-mode input noise rejection.

The BEMF/slope detector 630 may operate in several phases of operation. During a reset phase, switches S1 and S2 may be closed, such that the output terminals of the capacitors 631 and 633 are pulled to a reference voltage, $V_{ref}$. During a sampling phase, switches S1 and S2 may be opened. Changes in the voltages at nodes N1 and N2 may include corresponding changes in voltage at the inputs to the comparator 632. The comparator 632 may generate a binary output that represents a direction of change in the BEMF signal as represented by the voltages on nodes N1 and N2. The switches S1 and S2 may close upon conclusion of the sampling phase, which resets the capacitors 631, 633 for another iteration of operation. Operation of the BEMF/slope detector 630 may repeat for as long as desired until the test is completed.

Although FIG. 6 illustrates an embodiment in which input terminals of the BEMF/slope detector 630 are coupled across nodes of the driving system 610, the principles of the present invention may be extended to other configurations. For example, input terminals of the BEMF/slope detector may be coupled across the motor M rather than the driving system 610.

Figure 7:
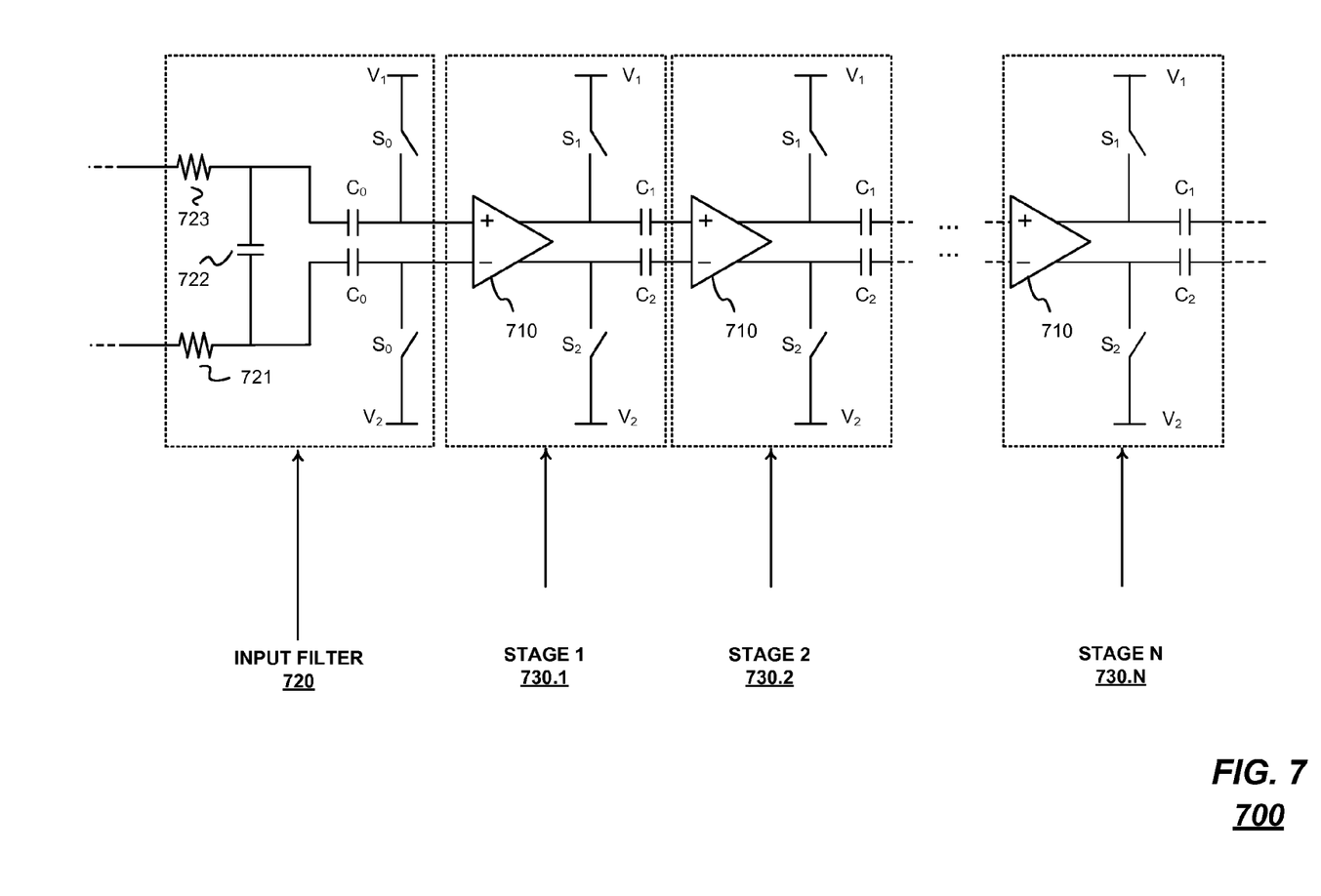
FIG. 7 is a simplified circuit diagram of a multi-stage comparator according to an embodiment of the present invention.

FIG. 7 illustrates a BEMF/slope detector 700 according to a further embodiment of the present invention. In this configuration, the detector 700 may include an input filter system 720, and a plurality of sampling stages 730.1-730.N. The input filter system 720 may include an RC circuit, sampling capacitors C0, and sampling switches S0. For example, the RC circuit of the input filter may include resistors 721 and 723 and capacitor 722, as shown. A buffer (not shown) may be coupled between the RC circuit and the sampling capacitors C0, which provides improved charge isolation. The input filter 720 may have multiple stages (not shown). The input filter 720 conditions an input signal for sampling by stages 730.1-730.N, and may be coupled to respective positive and negative inputs of the comparator 710 of the first sampling stage 730.1.

Each sampling stage may include a comparator 710, switches S1 and S2, and capacitors C1 and C2. Switches S1 and S2 respectively may connect the outputs of comparator 710 of stage 730.1 to reference voltages V1 and V2. A first terminal (again, the "input terminal") of capacitor C1 may be connected to a first output of comparator 710, and an input terminal of capacitor C2 may be connected to a second output of comparator 710. Output terminals of capacitors C1 and C2 may be coupled to respective positive and negative inputs of comparator 710 of stage 730.2. Each stage may be connected to the next in this fashion. In this way, the offset of each stage may be stored on its output capacitors C1 and C2, such that when the switches S1 and S2 are opened, the subsequent stage may see only the differential signal representing the direction of change in the input signal with near zero or substantially no offset contribution from the previous stage. For the later stages, for example stage 730.N, the input signal may be gained up sufficiently so as to have adequate signal-to-noise ratio. Earlier stages, such as the stages 730.1, 730.2, may include filtering to reject differential supply noise.

The BEMF/slope detector 700 of the FIG. 7 embodiment is a multi-stage low-offset comparator. A low offset comparator improves the accuracy of slope detection, because it is better able to distinguish a change in the slope of a signal when the amplitude of the signal is small. The comparator offset may be advantageously designed to be less than the maximum change in voltage for successive BEMF samples. This is dependent on the magnitude and frequency of the BEMF, as well as the sampling rate of the system.

Figure 8:
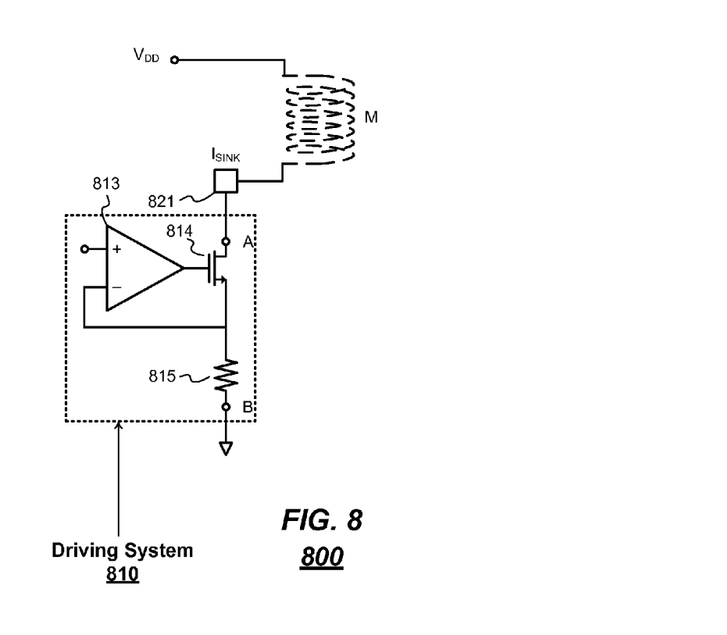
FIG. 8 is simplified circuit diagram of a driver according to an embodiment of the present invention.

FIG. 8 is a circuit diagram of a driving system 800 according to another embodiment of the present invention. The system 800 may include a driving system 810 and a motor M. The driving system 810 may include an operational amplifier 813, a current modulating transistor 814 and a resistor 815. The transistor 814 and resistor 815 may be provided in series with a motor M of the mechanical system between a source voltage VDD and ground. During operation, the operational amplifier 813 may control conductivity of the transistor 814 to ensure that voltage generated at a node between the transistor 814 and the resistor 815 matches an input voltage presented to the amplifier 813.

The embodiment of FIG. 8 may be used with the BEMF/Slope detectors of any of the foregoing embodiments. The BEMF/Slope detectors may have their inputs coupled to a node 821 at a coupling between the driver 810 and the motor M. For BEMF/Slope detectors with differential inputs, a second input may be taken from one of the supply voltages ($V_{DD}$ or ground).

The BEMF signal measured across the driving system 810 will have equal magnitude as BEMF signal measured across the motor M, but may be 180 degrees out of phase. It may be advantageous to measure the BEMF signal from across the driving system 810, because the signal may be less noisy. If the motor M has higher impedance than the driving system 810, the motor M may filter out much of the high frequency switching noise.

Figure 9:
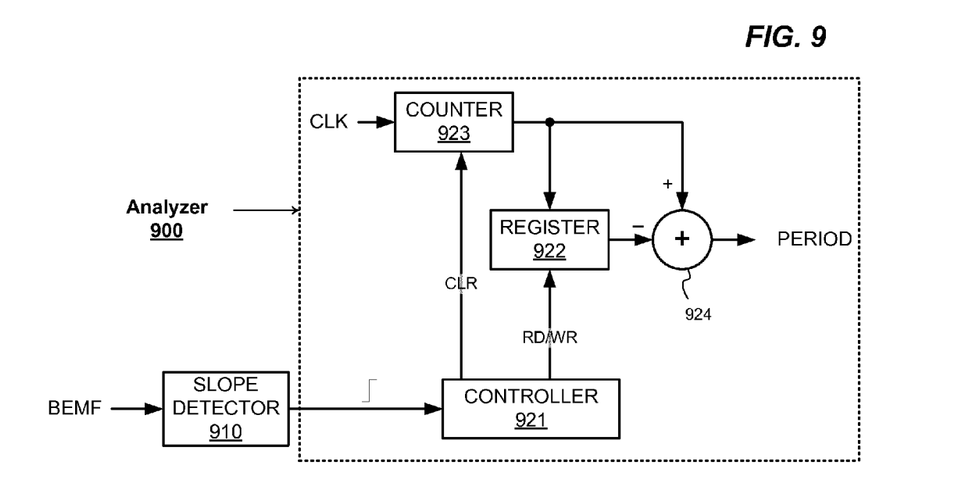
FIG. 9 is an exemplary analyzer for determining a resonant period according to an embodiment of the present invention.

FIG. 9 is a functional block diagram of an analyzer 900 for determining a resonant period according to an embodiment of the present invention. The analyzer may process signals generated from a slope detector 910 of one of the foregoing embodiments. The analyzer 900 may include a controller 921, a register 922, a counter 923 and a subtractor 924.

To detect a resonant period of the mechanical system M, the counter 923 may be provided as a free-running counter that increments itself according to a system clock. It may be cleared from time to time by the controller 921.

The controller 921 may monitor signals output from the slope detector 910 and respond to state changes in those signals. For example, when it detects a first transition in the output of the slope detector 910, the controller 921 may cause a current count value to be stored from the counter 923 to the register 922. The controller 921 may continue to allow the counter 923 to increment by the CLK signal until it detects a second occurrence of the first transition in the output of the slope detector 910 (e.g., a second occurrence of a high-to-low transition). The controller 921 may cause a count value of the counter 923 and the prior count value as stored in the register 922 both to be read to the subtractor 924. The subtractor 924 may output a value representing a difference between the two count values, which represents a resonant period of the mechanical system, measured in CLK clock cycles.

In alternative embodiments of the present invention, it is also possible to determine the resonant frequency of the VCM by replacing the slope detector described above with a peak detector, zero-crossing detector, ADC (analog-to-digital converter), or an analog front-end such as the one described in U.S. Patent App. Pub. No. 2012/0229264, which is hereby incorporated herein by reference in its entirety.

The analyzer 900 illustrated in FIG. 9 is a functional block diagram only. The components illustrated in FIG. 9 may be implemented as hardware circuits in an integrated circuit or alternatively may be implemented in software or firmware to be executed by a controller within an integrated circuit. Such implementation differences are immaterial to the present discussion unless described elsewhere herein.

It will be appreciated that determination of the resonance frequency may have many other useful applications, including in the control of haptics. The descriptions and illustrations of the embodiments above should be read as exemplary and not limiting. Modifications, variations, and improvements are possible in light of the teachings above and the claims below, and are intended to be within the spirit and scope of the invention.

What is claimed is:

1. A method for determining a resonant frequency of a motor-driven mechanical system, the method comprising:
   driving a current step into the motor-driven mechanical system;
   during a sample period:
      sampling a back-EMF signal of the motor-driven mechanical system twice in succession, and
      generating a binary signal from the two successive samples;
   identifying first and second occurrences of a same type of predetermined event from the generated binary signal; and
   determining the resonant frequency of the mechanical system based on a time that elapses between the first and second occurrences of the same type of predetermined event in the back-EMF signal.

2. The method of claim 1, wherein the predetermined event is a polarity change in the back-EMF signal.

3. The method of claim 1, wherein the determination of the resonant frequency is further based on the time that elapses between a first type of polarity change in the back-EMF signal and a subsequent occurrence of the same type of polarity change in the back-EMF signal.

4. The method of claim 1, wherein the back-EMF signal is detected from a node joining the motor-driven mechanical system and a driver of the motor-driven mechanical system.

5. The method of claim 1, wherein the predetermined event is a transition in the back-EMF signal.

6. An automatic resonance detection and driving system for a motor-driven mechanical system, comprising:
   a driver, including:
      a register to store a resonant frequency of the motor-driven mechanical system; and
      a drive-signal generator that generates a drive signal based on the resonant frequency;
   a back-EMF detector, including:
      a pair of sampling capacitors having inputs each coupled to a common node of the driver by respective sampling switches and coupled to each other by a respective drive switch,
      a comparator, having inputs coupled to outputs of the sampling capacitors, and
      a controller to generate sampling control signals to the respective sampling switches in succession with each other in a sampling phase and to generate an output control signal to the drive switch in an output phase; and
   an analyzer that determines the resonant frequency of the motor-driven mechanical system based on timing of successive occurrences of a same type of predetermined event from the sampling control signals generated during the sampling phase.

7. The system of claim 6, wherein the predetermined event is a polarity change in the back-EMF signal.

8. The system of claim 6, further comprising a slope detector that detects a slope of the back-EMF signal.

9. The system of claim 8, wherein the predetermined event is a polarity change in the slope of the back-EMF signal.

10. The system of claim 8, wherein the slope detector is a comparator having an offset less than a maximum change in voltage of the back-EMF signal.

11. The system of claim 8, wherein the slope detector comprises:
    a comparator;
    a first switch connected to an input of the slope detector;
    a second switch connected to the input and in parallel with the first switch;
    a first capacitor connected between the first switch and a first input to the comparator;
    a second capacitor connected between the second switch a second input to the comparator; and
    a third switch connected between input terminals of the first capacitor and input terminals of the second capacitor;
    a fourth switch connecting an output terminal of the first capacitor to a reference voltage; and
    a fifth switch connecting an output terminal of the second capacitor to the reference voltage.

12. An automatic resonance detection and driving system for a motor-driven mechanical system, comprising:
    a driver including:
       a register to store a resonant frequency of the motor-driven mechanical system; and
       a drive-signal generator that generates a drive signal to a motor based on the resonant frequency;
    a resonance detector, including:
       a pair of sampling capacitors having inputs, each coupled to a separate node of a circuit occupied by the driver and the motor by respective sampling switches, and coupled to each other by a respective drive switch, and
       a comparator, having inputs coupled to outputs of the sampling capacitors, and
       a controller to generate sampling control signals to the respective sampling switches in a sampling phase and to generate an output control signal to the drive switch in an output phase; and
    an analyzer that determines the resonant frequency of the motor-driven mechanical system based on timing of successive occurrences of a same type of predetermined event from the sampling control signals generated during the sampling phase.

13. The system of claim 12, wherein the resonance detector comprises:
    a comparator;
    a first capacitor having an input terminal connected to a first input of the resonance detector and an output terminal connected to a first input to the comparator;
    a second capacitor having an input terminal connected to a second input of the resonance detector and an output terminal connected to a second input to the comparator;
    a first switch connecting the output terminal of the first capacitor to a reference voltage; and
    a second switch connecting the output terminal of the second capacitor to the reference voltage.

14. The system of claim 13, further comprising:
    an input filter including:
       a first resistor having a first end connected to a first input;
       a second resistor having a first end connected to a second input; and
       a first capacitor connecting a second end of the first resistor to a second end of the second resistor; and
    an input sampler including:
       a third capacitor having a first end connected to the second end of the first resistor of the input filter;
       a fourth capacitor having a first end connected to the second end of the second resistor of the input filter;

a first switch connecting a second end of the third capacitor to a first reference voltage; and
a second switch connecting a second end of the fourth capacitor to a second reference voltage;
wherein a second end of the third capacitor is coupled to a first input of the comparator of the first stage of the slope detector and a second end of the fourth capacitor is coupled to a second input of the comparator of the first stage of the slope detector.

15. The system of claim 12, wherein the resonance detector comprises, a multi-stage detector, each stage having:
a comparator;
a first capacitor with a first end connected to a first output of the comparator;
a second capacitor with a first end connected to a second output of the comparator;
a first switch connecting the first end of the first capacitor to a first reference voltage;
a second switch connecting the first end of the second capacitor to a second reference voltage;
wherein the second end of the first capacitor of the first stage is a first input to the comparator of the second stage and the second end of the second capacitor of the first stage is a second input to the comparator of the second stage.

16. The system of claim 15, wherein the slope detector has four stages.

17. A resonance detector, comprising:
a counter driven by a clock signal,
a detector coupled to a source of a back-EMF signal generated by an oscillating system, the detector configured to, during a sampling period:
sample the back-EMF signal generated by the oscillating system twice in succession, and
generate a binary signal from the two successive samples, and a controller to:
update the counter based the generated binary signal of each sample period,
detect first and second occurrences of a same type of predetermined event from the counter,
wherein a time that elapses between the first and second occurrences of a same type of predetermined event represents a resonant period of the oscillating system.

18. The resonance detector of claim 17, wherein the detector comprises:
a comparator;
a first switch connected to an input of the slope detector;
a second switch connected to the input and in parallel with the first switch;
a first capacitor connected between the first switch and a first input to the comparator;
a second capacitor connected between the second switch a second input to the comparator; and
a third switch connecting input terminals of the first capacitor and the second capacitor together.

19. The resonance detector of claim 17, wherein the detector comprises:
a comparator;
a first capacitor having an input terminal connected to a first input of the slope detector and an output terminal connected to a first input to the comparator;
a second capacitor having an input terminal connected to a second input of the slope detector and an output terminal connected to a second input to the comparator;
a first switch connecting the output terminal of the first capacitor to a reference voltage; and
a second switch connecting the output terminal of the second capacitor to the reference voltage.

20. A method for determining the resonant frequency of a motor-driven mechanical system, the method comprising:
driving a current step into the motor-driven mechanical system;
during a sample period:
sampling a back-EMF signal from two separate nodes of the motor-driven mechanical system;
generating a binary signal from the two samples;
identifying first and second occurrences of a same type of predetermined event from the generated binary signal; and
determining the resonant frequency of the mechanical system based on a time that elapses between the first and second occurrences of the same type of predetermined event in the back-EMF signal.

21. The method of claim 20, wherein the back-EMF signal is represented by a pair of voltages sampled from the two nodes.

22. The method of claim 20, wherein the back-EMF signal is represented by a pair of voltages sampled from the two nodes, then filtered to obtain a signal representing a slope of the back-EMF.

* * * * *